(12) United States Patent
Takahashi

(10) Patent No.: US 11,165,986 B2
(45) Date of Patent: Nov. 2, 2021

(54) DATA TRANSFER APPARATUS AND CONTROL METHOD THEREOF

(71) Applicant: CANON KABUSHIKI KAISHA, Tokyo (JP)

(72) Inventor: Tomoaki Takahashi, Isehara (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/837,581

(22) Filed: Apr. 1, 2020

(65) Prior Publication Data
US 2020/0336694 A1 Oct. 22, 2020

(30) Foreign Application Priority Data
Apr. 18, 2019 (JP) .............................. JP2019-079567

(51) Int. Cl.
*H04N 5/76* (2006.01)
*G11B 27/36* (2006.01)
*H04N 5/77* (2006.01)

(52) U.S. Cl.
CPC ............... *H04N 5/76* (2013.01); *G11B 27/36* (2013.01)

(58) Field of Classification Search
USPC ............... 386/223–224, 239–248, 278–290
See application file for complete search history.

(56) References Cited

U.S. PATENT DOCUMENTS

| 5,742,339 A * | 4/1998 | Wakui | H04N 1/2158 348/231.9 |
| 6,445,460 B1 * | 9/2002 | Pavley | H04N 1/2112 358/1.15 |
| 6,668,134 B1 * | 12/2003 | Niikawa | G11B 27/034 348/231.1 |
| 7,605,849 B1 * | 10/2009 | Hatanaka | G11B 27/10 348/231.2 |
| 2008/0021959 A1 * | 1/2008 | Naghi | G06F 21/85 709/204 |
| 2010/0157067 A1 * | 6/2010 | Karn | H04N 1/00461 348/207.1 |
| 2011/0109728 A1 * | 5/2011 | Yoo | H04N 13/183 348/51 |
| 2011/0142410 A1 * | 6/2011 | Ishii | H04N 9/7921 386/224 |

(Continued)

FOREIGN PATENT DOCUMENTS

| JP | 2015219717 A | 12/2015 |
| JP | 2018186467 A | 11/2018 |

*Primary Examiner* — Hung Q Dang
(74) *Attorney, Agent, or Firm* — Carter, DeLuca & Farrell LLP

(57) ABSTRACT

A data transfer apparatus comprises an interface configured to connect to an external apparatus, a transfer unit configured to transfer image data to the external apparatus connected by the interface, a recording unit configured to generate and record the image data and information indicating a transfer state of the image data, and a control unit configured to control so as to transfer the image data and related data associated with the image data. The recording unit is configured to, with respect to image data that has already been transferred, if related data associated with the image data has been edited, generate and record information indicating a transfer state of the edited related data.

20 Claims, 14 Drawing Sheets

(56) References Cited

U.S. PATENT DOCUMENTS

2012/0300259 A1\* 11/2012 Hosaka .............. H04N 21/4334
358/1.15
2015/0007047 A1\* 1/2015 Wang ...................... H04L 67/06
715/748

\* cited by examiner

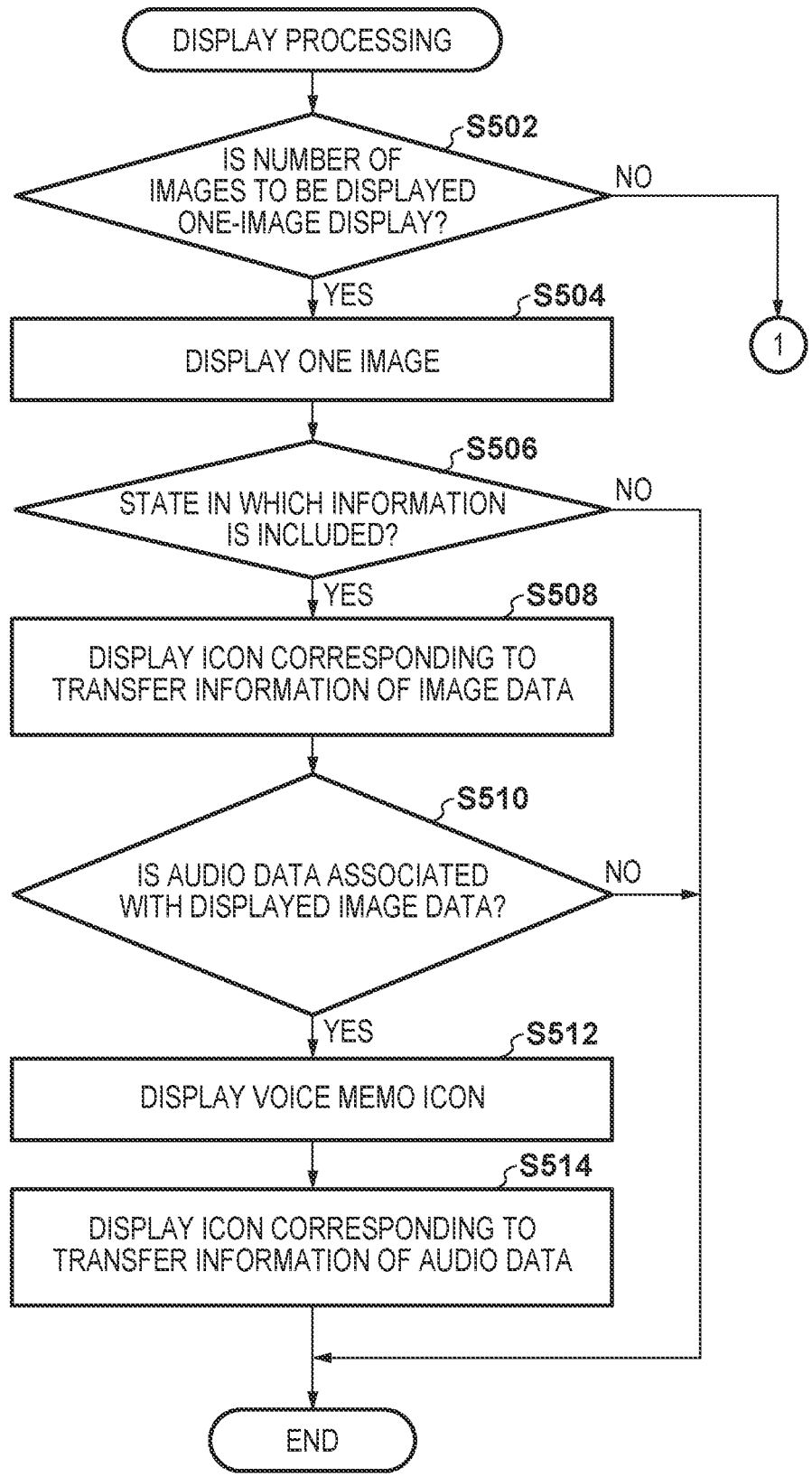

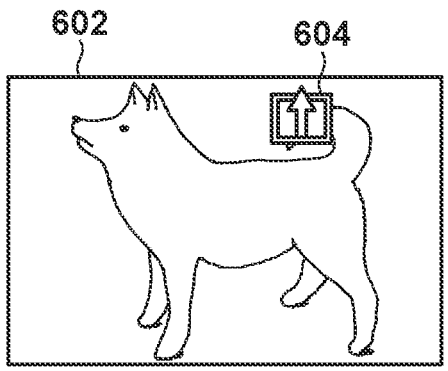
F I G. 6A
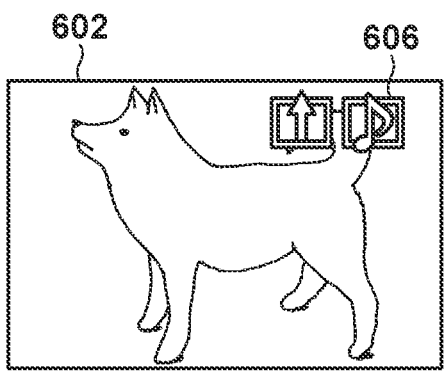
F I G. 6B
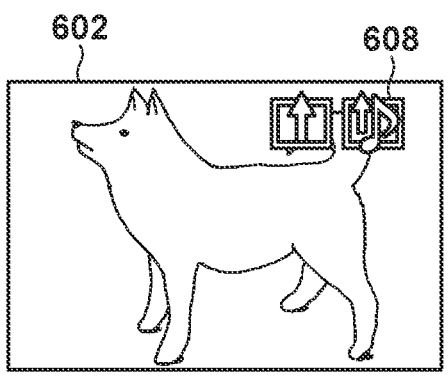
F I G. 6C
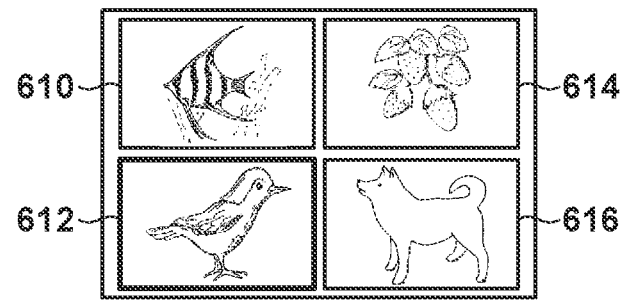
F I G. 6D
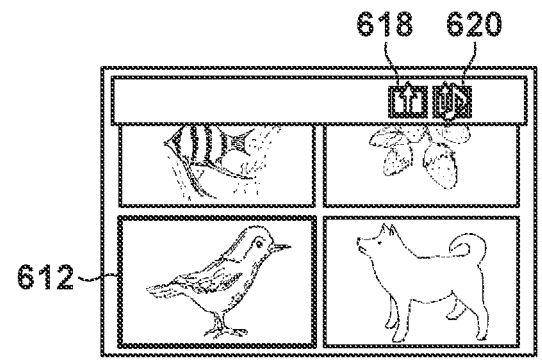
F I G. 6E
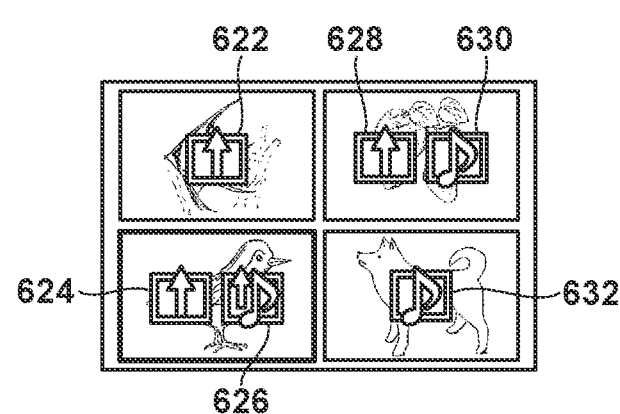
F I G. 6F

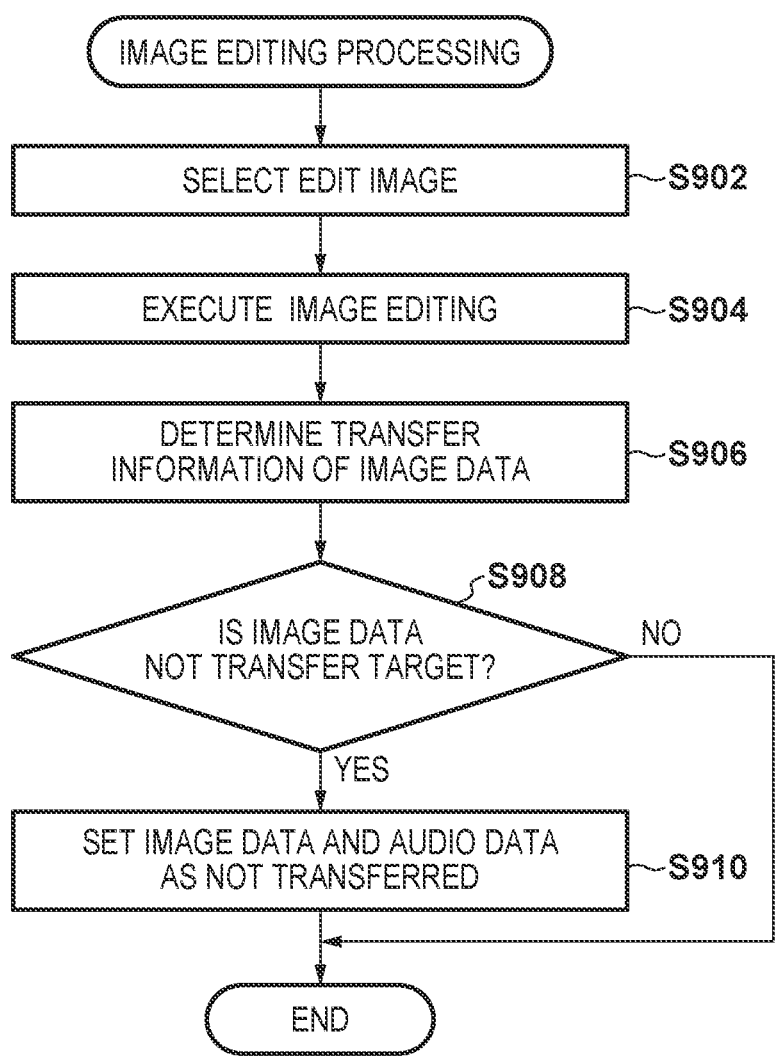

DATA TRANSFER APPARATUS AND CONTROL METHOD THEREOF

BACKGROUND OF THE INVENTION

Field of the Invention

The present embodiment relates to a data transfer technique.

Description of the Related Art

There are image capturing apparatuses that transfer image data to external apparatuses via a network. Also, there are image capturing apparatuses in which a voice memo function is incorporated for business uses and the like. The audio data generated by recording as a voice memo is associated with image data, and when the image data is transferred to an external apparatus, the associated audio data is also transferred.

Controlling the transmission, to an external apparatus, of image data with which audio data is associated is described in Japanese Patent Laid-Open No. 2015-219717. In Japanese Patent Laid-Open No. 2018-186467, a method is described in which, if image data with which audio data is associated has been set as a transfer target at the timing at which the audio data is recorded, the audio data is also set as a transfer target.

However, with a known technique, when image data has already been transferred, the audio data generated by recording so as to be added to the image data is not set as a transfer target, and therefore, when it is desired that the image data and the audio data are transferred again or the like, it is difficult to know whether the added audio data has already been transferred.

SUMMARY OF THE INVENTION

The present invention has been made in consideration of the aforementioned problems, and realizes techniques that make it possible to easily confirm the transfer state of related data associated with image data that has already been transferred.

In order to solve the aforementioned problems, the present embodiment provides a data transfer apparatus comprising: an interface configured to connect to an external apparatus; and a memory and at least one processor and/or at least one circuit to perform operations of the following units: a transfer unit configured to transfer image data to the external apparatus connected by the interface; a recording unit configured to generate and record the image data and information indicating a transfer state of the image data; and a control unit configured to control so as to transfer the image data and related data associated with the image data, wherein the recording unit is configured to, with respect to image data that has already been transferred, if related data associated with the image data has been edited, generate and record information indicating a transfer state of the edited related data.

In order to solve the aforementioned problems, the present embodiment provides a method of controlling a data transfer apparatus that can transfer image data to an external apparatus connected by an interface, the method comprising: generating and recording information indicating a transfer state of the image data; and controlling so as to transfer the image data and related data associated with the image data, wherein, in the recording, with respect to image data that has already been transferred, if related data associated with the image data has been edited, information indicating a transfer state of the edited related data is generated and recorded.

In order to solve the aforementioned problems, the present embodiment provides a non-transitory computer-readable storage medium storing a program for causing a computer to function as a data transfer apparatus comprising: an interface configured to connect to an external apparatus; a transfer unit configured to transfer image data to the external apparatus connected by the interface; a recording unit configured to generate and record the image data and information indicating a transfer state of the image data; and a control unit configured to control so as to transfer the image data and related data associated with the image data, wherein the recording unit is configured to, with respect to image data that has already been transferred, if related data associated with the image data has been edited, generate and record information indicating a transfer state of the edited related data.

According to the present invention, the transfer state of related data associated with image data that has already been transferred can be easily confirmed.

Further features of the present invention will become apparent from the following description of exemplary embodiments (with reference to the attached drawings).

BRIEF DESCRIPTION OF THE DRAWINGS

FIGS. 5A and 5B are flowcharts illustrating display processing of the present embodiment.

FIGS. 6A to 6F are diagrams illustrating exemplary UI screens of the present embodiment.

FIG. 9 is a flowchart illustrating image editing processing of the present embodiment.

FIGS. 12A-1 and 12A-2 are flowcharts illustrating image transfer processing of the present embodiment.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached draw-

First Embodiment

Embodiments upon application of the present invention to a data transfer apparatus such as a digital single-lens reflex camera capable of shooting a still image and/or moving image will be described in detail hereinafter with reference to the drawings.

Apparatus Configuration

The configuration and functions of a camera according to the present embodiment will be described below with reference to FIGS. 1A, 1B and 2.

Figure 1A:
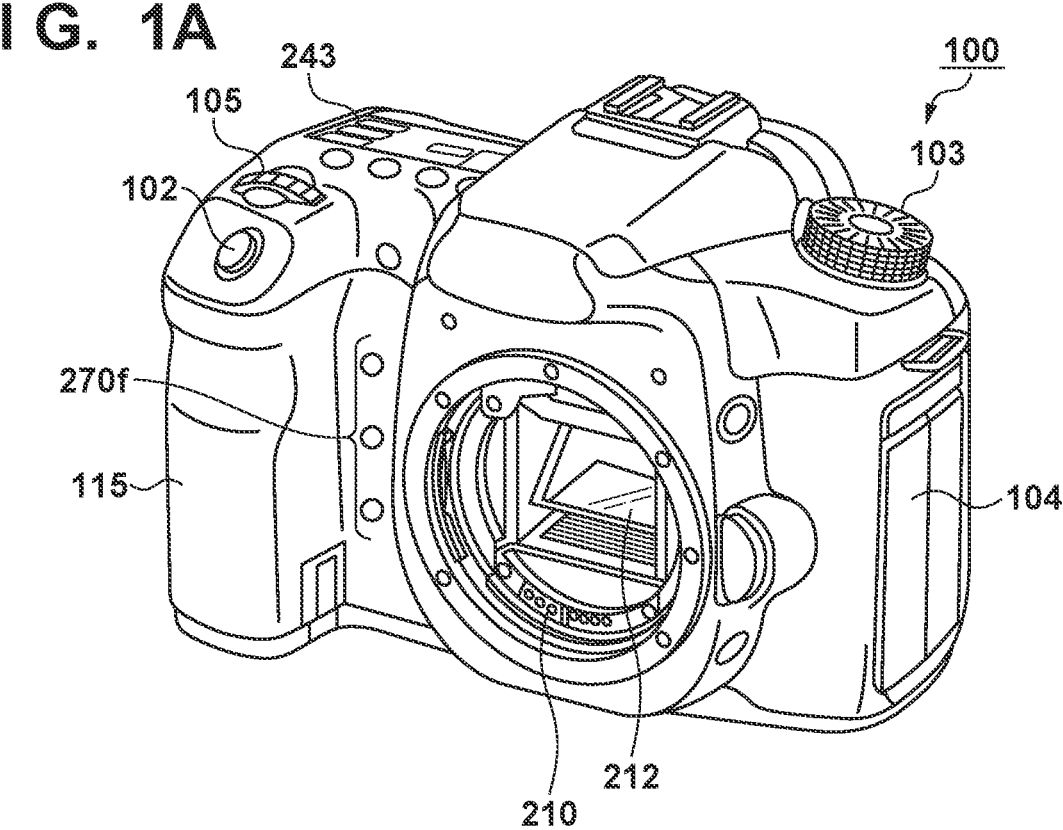
FIG. 1A is a front perspective view of an apparatus of the present embodiment.
Figure 1B:
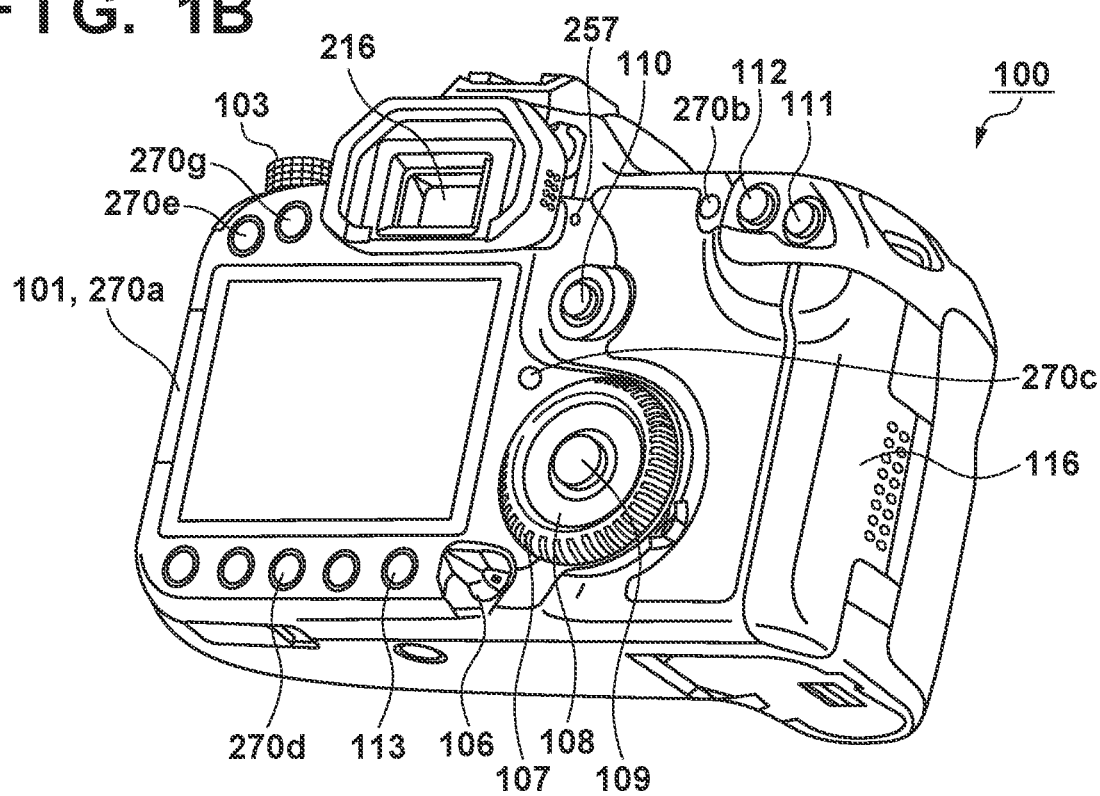
FIG. 1B is a back perspective view of the apparatus of the present embodiment.

FIG. 1A is a front perspective view of the digital camera 100, and FIG. 1B is a back perspective view of the digital camera 100.

In FIGS. 1A and 1B, a backside display unit 101 is a display device for displaying images and various types of information, such as an LCD provided on the back surface of the camera body. Moreover, the backside display unit 101 has a function of reproducing a still image after the still image was shot, a function of displaying a moving image that is being recorded, and a live view display (through-the-lens display) function as well. An out-of-finder display unit 243 is a display device such as an LCD provided on the upper surface of the camera body, and displays various setting values of the camera such as a shutter speed and a diaphragm aperture.

A shutter-release button 102 is an operation unit for giving a shooting instruction. A mode selection switch 103 is a dial type operation unit for switching between various modes. A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is also a rotating operation member included in the operation units 270 that will be described later with reference to FIG. 2, and can move a selected frame, scroll images, and the like. A cross key 108 is a movement instruction member also included in the operation units 270 that will be described later with reference to FIG. 2, and can perform, by one of four-directional buttons constituted by UP, DOWN, LEFT and RIGHT being pressed down, an operation that corresponds to the pressed portion of the cross key 108.

A SET button 109 is a push button also included in the operation units 270 that will be described later with reference to FIG. 2, and is mainly used for determining selection items, and the like. A live view button 110 is also a push button included in the operation units 270 that will be described later with reference to FIG. 2, is used for the switching on/off of live view (hereinafter, it may be referred to as "LV") display in a still image shooting mode, and is used for giving an instruction to start or stop moving image shooting (recording) in a moving image recording mode. An enlargement button 111 is also a push button included in the operation units 270 that will be described later with reference to FIG. 2, and is an operation member for the switching on/off of enlarged display during a live view and changing the magnification during the enlarged display. In addition, the enlargement button 111 is an operation member for enlarging a reproduced image and increasing the magnification in a reproduction mode. A reduction button 112 is also a push button included in the operation units 270 that will be described later, and is an operation member for reducing the magnification of a reproduced image that is enlarged, and displays a screen in a reduced state. A reproduction button 113 is also a push button included in the operation units 270 that will be described later with reference to FIG. 2, and is an operation member for switching between a shooting mode and a reproduction mode. When the reproduction button 113 is pressed during the shooting mode, the operation mode transits to the reproduction mode, and the latest image among the images recorded on the recording medium 250 can be displayed on the backside display unit 101 or the external apparatus 300.

A quick return mirror 212 is driven to an upward position (an exposure position) or a downward position (a live view position) by an actuator (not illustrated) in accordance with an instruction from a system control unit 201 that will be described later with reference to FIG. 2. A communication terminal 210 is an electric contact for the digital camera 100 to perform communication with a lens unit 200 (FIG. 2). A look-in eyepiece finder 216 is an optical member for checking, by observing a focusing screen 213 (FIG. 2), the focus and composition of an object image taken in through the lens unit 200. A lid 116 is a member for opening or closing a slot for mounting/removing the recording medium 250 to/from the digital camera 100. A grip 115 has a shape that makes it easy to be grasped by a user's right hand when he or she holds the digital camera 100.

Further, the digital camera 100 includes an AF-ON button 270b, a quick setting button 270c, an active frame switching button 270d, a menu button 270e, a function button 270f, and an info button 270g as operation members included in the operation units 270 that will be described later with reference to FIG. 2.

Next, the internal configuration of the digital camera 100 and lens unit 200 according to the present embodiment will be described with reference to FIG. 2. In FIG. 2, configurations that are the same as in FIGS. 1A and 1B are denoted by the same reference signs.

Figure 2:
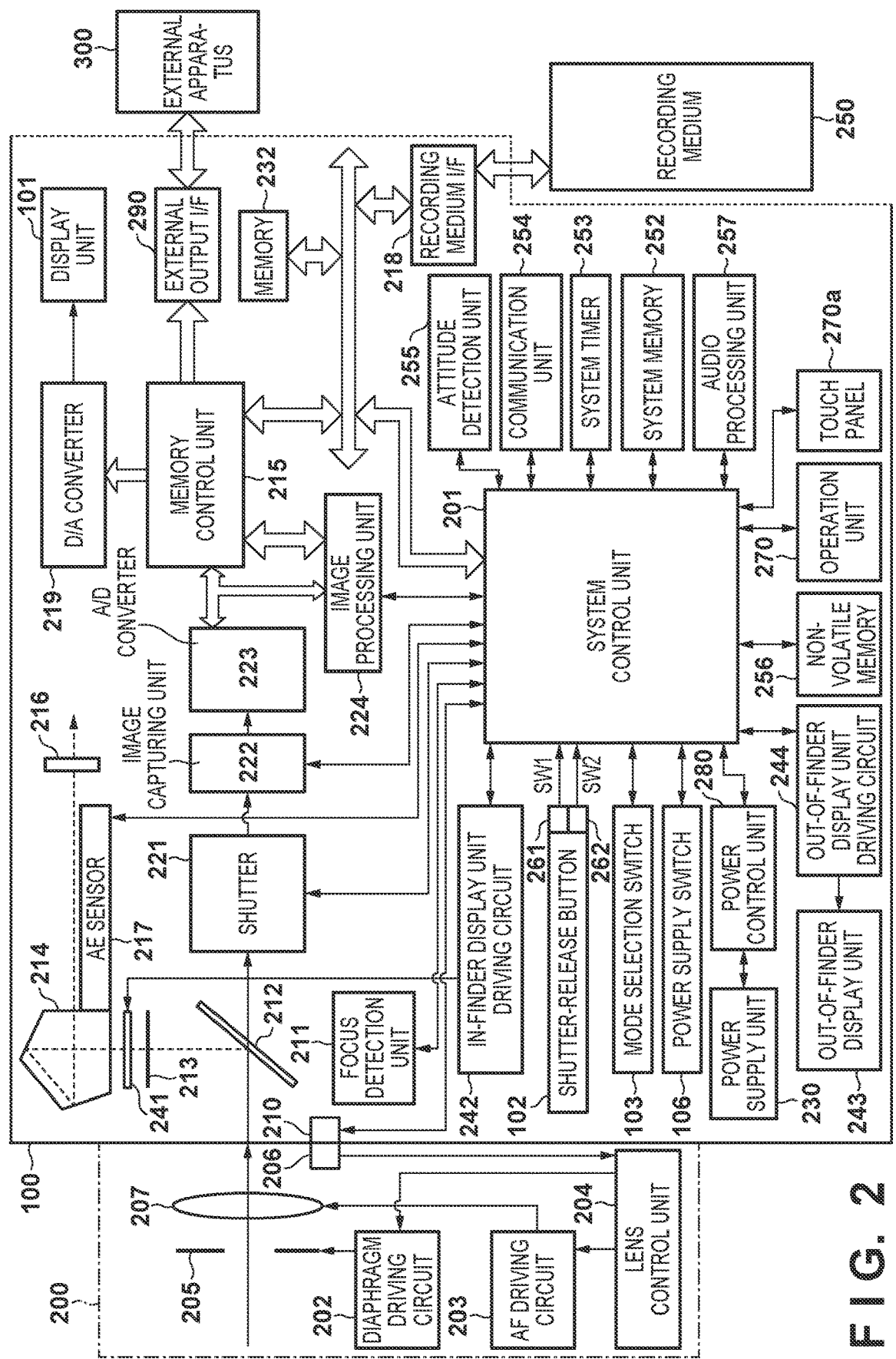
FIG. 2 is a block diagram showing an apparatus configuration of the present embodiment.

In FIG. 2, the lens unit 200 is equipped with a shooting lens 207, and is detachable from the digital camera 100. The shooting lens 207 is usually constituted by a plurality of lenses, but is simplified here and is shown by one lens only. A communication terminal 206 is an electric contact for the lens unit 200 to perform communication with the digital camera 100. The communication terminal 210 is an electric contact for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

An AE sensor 217 performs photometry to obtain the luminance of the object taken in through the lens unit 200. A focus detection unit 211 outputs a defocus amount to the system control unit 201, and the system control unit 201 communicates with the lens unit 200 in accordance with the defocus amount, and performs a control for automatic focus processing using a phase difference detection method.

The quick return mirror 212 receives an instruction from the system control unit 201 at the time of exposure, live view display, and moving image shooting, and is driven to the upward position or the downward position by the actuator (not illustrated). The quick return mirror 212 switches luminous flux entering the shooting lens 207 to the eyepiece finder 216 or an image capturing unit 222. The quick return mirror 212 is usually biased toward the downward position so as to reflect the luminous flux and guide the luminous flux to the eyepiece finder 216, but for exposure and live view display, jumps upward and recedes from the luminous flux (to the upward position) so as to guide the luminous flux to the image capturing unit 222. In addition, the central portion of the quick return mirror 212 is a half mirror such that a portion of the luminous flux passes through and enters the focus detection unit 211. The photographer can check, via a pentagonal prism 214 and the eyepiece finder 216, the focus and composition of the object image taken in through the lens unit 200 by observing the focusing screen 213.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. A/D converter 223 converts analog signals output from the image capturing unit 222 into digital signals and generates image data.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

The digital data from the A/D converter 223 is directly written into a memory 232 via both the image processing unit 224 and the memory control unit 215 or via the memory control unit 215. The memory 232 stores the image data obtained from the image capturing unit 222 and the A/D converter 223, and image display data to be displayed on the backside display unit 101 or the external apparatus 300. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into an analog signal and supplies the backside display unit 101 with the analog signal. The image display data that was written into the memory 232 is displayed by the backside display unit 101 via the D/A converter 219. The backside display unit 101 performs display in accordance with the analog signal from the D/A converter 219. In this manner, the digital signals stored in the memory 232 are converted into analog signals, and the analog signals are successively transmitted to the backside display unit 101 so as to be displayed thereon, making it possible to realize an electronic view finder (EVF) functionality and to perform live view display (through image display).

A frame that indicates a ranging point (AF position) at which AF processing is currently performed, an icon that indicates the setting state of the camera, and the like are displayed on an in-finder display unit 241 via an in-finder display unit driving circuit 242. Accordingly, the user can check the AF position and camera setting state through an optical viewfinder (OVF) that enables an object image picked up by the lens unit 200 to be viewed by looking through the eyepiece viewfinder 216.

Various setting values of the camera such as a shutter speed and a diaphragm aperture are displayed on the out-of-finder display unit 243 via an out-of-finder display unit driving circuit 244.

An external output I/F 290 supplies image display data stored in the memory 232 to the external apparatus 300 in a form of digital signal as is. For example, the external output I/F 290 outputs moving image data in a stream format in accordance with a communication protocol conforming to the HDMI (registered trademark) (High-Definition Multimedia Interface) standard. In this way, the display image data written into the memory 232 is displayed in the external apparatus 300.

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various flowcharts that will be described later.

The system control unit 201 has a CPU (Central Processing Unit or an MPU (Micro Processing Unit) for overall controlling the entire digital camera 100, and realizes, by executing the programs stored in the nonvolatile memory 256, the procedures of the flowchart that will be described later. The system memory 252 is, for example, a RAM and used also as a work memory where constants and variables for operating the system control unit 201, and the programs read out from the nonvolatile memory 256 are expanded. The system control unit 201 controls the memory 232, the D/A converter 219, the backside display unit 101, the external output I/F 290, and the like, so as to perform display control. A system timer 253 is a time measurement unit for measuring time periods for various types of controls and the time of an integrated clock.

A mode selection switch 103, a first shutter switch 261, a second shutter switch 262, and the operation units 270 are operation members for inputting various types of instructions into the system control unit 201. The mode selection switch 103 switches the operation mode of the system control unit 201 to any of a still image shooting mode, a moving image recording mode, and a reproduction mode. The still image shooting mode includes an automatic shooting mode, an automatic scene determination mode, a manual mode, aperture-priority AE mode (Av mode), shutter-priority AE mode (Tv mode). The still image shooting mode also includes various scene mode each of which scene-specific shooting setting is made, a program AE mode, a custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, also the moving image recording mode and the reproduction mode may include a plurality of modes.

While the shutter-release button 102 provided on the digital camera 100 is being operated, that is, pressed halfway (the shooting preparation instruction), the first shutter switch 261 is turned on and generates a first shutter switch signal SW1. Upon receiving the first shutter switch signal SW1, the system control unit 201 causes the image processing unit 224 to start the AF processing, the AE processing, the AWB processing, the EF processing and the like.

When the operation of the shutter-release button 102 is completed, that is, the shutter-release button 102 is pressed fully (the shooting instruction), the second shutter switch 262 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

By selecting items for setting various functions or items representing setting values displayed on the backside display unit 101 and the external apparatus 300, appropriate functions for each situation are assigned to the operation units 270, and the operation units 270 thus act as various function buttons. Examples of these function buttons include a menu button 270e, an end button, a back button, an image scrolling button, a jump button, a narrow-down button, and an attribute change button. For example, a menu screen that enables various settings to be made is displayed on the backside display unit 101 or the external apparatus 300 by pressing the menu button 270e. The user can make various settings intuitively by using the menu screen, which is displayed on the backside display unit 101 or the external apparatus 300, the cross key 108 and the SET button 109.

The operation unit 270 is an input unit that accepts an operation made by the user and notifies the system control unit 201 of the operation, and includes at least the following operation members. The operation members are the shutter-release button 102, the main electronic dial 105, the power supply switch 106, the sub electronic dial 107, the cross key 108, the SET button 109, the live view button 110, the enlargement button 111, the reduction button 112, and the reproduction button 113. The cross key 108 is a directional button in which upper, lower, right and left portions of the cross key 108 can be pushed down. Although the description is given as an integrated operation unit in the present embodiment, an up button, a down button, a right button, and a left button may be independent buttons. Hereinafter, the upper and lower portions are referred to as an up and down key, and the left and right portions are referred to as a left and right key. Also, the operation unit 270 also includes the following operation units.

An AF-ON button 270b is a push button switch included in the operation unit 270, and execution of AF can be instructed by pushing down the button. The pushing down direction of the AF-ON button 270b is parallel to the direction of subject light that is incident on the image capturing unit 222 from the lens unit 200 (optical axis).

The quick setting button 270c (hereinafter, Q button 270c) is a push button switch included in the operation unit 270, and a quick setting menu, which is a list of setting items that can be set in each operation mode, is displayed by pushing down the button. For example, if the button is pushed down while being in shooting standby in the live view shooting, a list of setting items such as an electronic front curtain shutter, brightness of the monitor, WB of the LV screen, two-point enlargement, and soundless shooting are displayed in a line so as to be superimposed on the LV. The user can change the setting relating to the selected setting item or shift the mode to the selected operation mode by selecting, from the displayed quick setting menu, a desired option using the up and down key, and pushing down the set button.

The active frame selection button 270d is a push button switch included in the operation unit 270, and with which active enlarged position (frame) can be switched between two enlarged positions. Also, the active frame selection button 270d is assigned with different functions in accordance with the operation mode, and upon being pushed down in the reproduction mode, a protect attribute can be given to the image being displayed.

The menu button 270e is a push button switch included in the operation unit 270, and by operating this button, a menu screen on which various settings can be performed is displayed in the backside display unit 101 or the external apparatus 300.

The function button 270f includes three push button switches that are included in the operation unit 270 and are assigned with respective functions. Each of the three buttons of the function button 270f is arranged at a position operable by a finger (middle finger, third finger, or little finger) of the right hand that holds the grip 115, and the pushing down direction is parallel to the direction of subject light that is incident on the image capturing unit 222 from the lens unit 200 (optical axis).

The info button 270g is a push button switch included in the operation unit 270, and is used to switch between various types of information displays.

A power control unit 280 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and constituted by a semiconductor memory, a magnetic disk, or the like.

The communication unit 254 is wirelessly connected or connected by a cable, and transmits and receives a video signal, an audio signal, and the like. The communication unit 254 can also connect to a wireless LAN (Local Area Network) and the Internet. FTP (File Transfer Protocol), PTP (Picture Transfer Protocol), or the like is envisioned as the communication protocol. Since it is envisioned that a known technique is to be used, the protocol is not specifically limited in the present embodiment. The communication unit 254 can transmit images (including through images) captured by the image capturing unit 222 and image files recorded in the recording medium 250, and can receive image files and various types of information from an external apparatus.

An attitude detection unit 255 detects the attitude (orientation) of the digital camera 100 with respect to the gravity direction. In this case, based on the attitude detected by the attitude detection unit 255, it is possible to discriminate whether an image captured by the image capturing unit 222 has been shot by setting the digital camera 100 in the landscape or portrait direction. The system control unit 201 can add information about the orientation information corresponding to the attitude detected by the attitude detection unit 255 to the image file, and rotate and record the captured image. An acceleration sensor, gyro sensor and the like may be used as an attitude detection unit 255.

An audio processing unit 257 acquires a user's voice and the like as an audio signal using a sound collecting unit such as a microphone, converts the acquired analog signal to a digital signal, and outputs the digital signal to the system control unit 201. The system control unit 201 generates audio data from the digital audio signal, and records the audio data after associating it to the image data as related data. Note that, in the present embodiment, audio data is illustrated as the related data, but there is no limitation thereto, and the related data may be text data and the like.

Included among the operation units 270 is also a touch panel (touch screen) 270a that is capable of detecting a touch operation on the backside display unit 101. The touch panel 270a and the backside display unit 101 can be constructed as a single integrated unit. For example, the touch panel 270a is constructed in such a manner that the transmittance of light will not interfere with the display presented by the backside display unit 101, and it is attached to the uppermost layer of the display face of the backside display unit 101. In addition, input coordinates on the touch panel 270a and display coordinates on the backside display unit 101 are correlated. As a result, a GUI can be constructed that makes it possible for the user to directly manipulate the screen displayed on the backside display unit 101. The system control unit 201 is capable of detecting the following touch operations and conditions performed by contacting the touch panel 270a.

Newly touching of the touch panel 270a by a finger or pen which has not been in contact with the touch panel 270a, that is a start of the touch (referred to as "touch-down" below).

A state in which the touch panel 270a is in contact with a finger or pen (referred to as "touch-on" below).

Movement of a finger or pen while in contact with the touch panel 270a (referred to as "touch-move" below).

Lifting of a finger or pen that has been in contact with the touch panel 270a, that is an end of the touch (referred to as "touch-up" below).

A state in which the touch panel 270a is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 270a is being touched by the finger or pen are communicated to the system control unit 201 through an internal bus and, based upon the information thus communicated, the system control unit 201 determines what kind of operation (touch operation) was performed on the touch panel 270a. As for "touch-move", the determination can be made also for every vertical component and horizontal component with regard to the direction of movement of the finger or pen, which is moved on the touch panel 270a, based upon a change in the coordinate position. Further, the system control unit 201 can determine that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 270a. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 270a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The present invention is not limited to an image capturing apparatus main body, and can also be applied in a control apparatus that communicates with an image capturing apparatus (including a network camera) through wired or wireless communication and remotely controls the image capturing apparatus. Apparatuses such as a smartphone, which is a type of mobile phone, a tablet PC, a desktop PC, and the like can be given as examples of control apparatuses that remotely control an image capturing apparatus. The image capturing apparatus can be controlled remotely by the control apparatus communicating commands for carrying out various types of operations, settings to the image capturing apparatus, and the like on the basis of operations made in the control apparatus, processes carried out by the control apparatus, and the like. Additionally, a live view image shot by the image capturing apparatus may be received by the control apparatus through wired or wireless communication and displayed.

Note that, in the present embodiment, a case has been described where the present invention is applied to a digital camera as an example, but the present invention is not limited to this example. That is, the present invention can be applied to an apparatus that includes a display unit and can transfer data to an external apparatus, such as a PDA (Personal Digital Assistant), a mobile phone terminal, a mobile image viewer, a printer apparatus including a display, a digital photo frame, a music player, a game machine, or an electronic book reader.

Control Processing

Next, the control processing performed by the digital camera 100 of the present embodiment will be described with reference to FIGS. 3 to 12.

Note that the processing of each of the flowcharts in FIGS. 3, 4, 5, 7, 9, 10, and 12A is realized by deploying a program stored in the nonvolatile memory 256 to the system memory 252, and the system control unit 201 executing the program.

Figure 3:
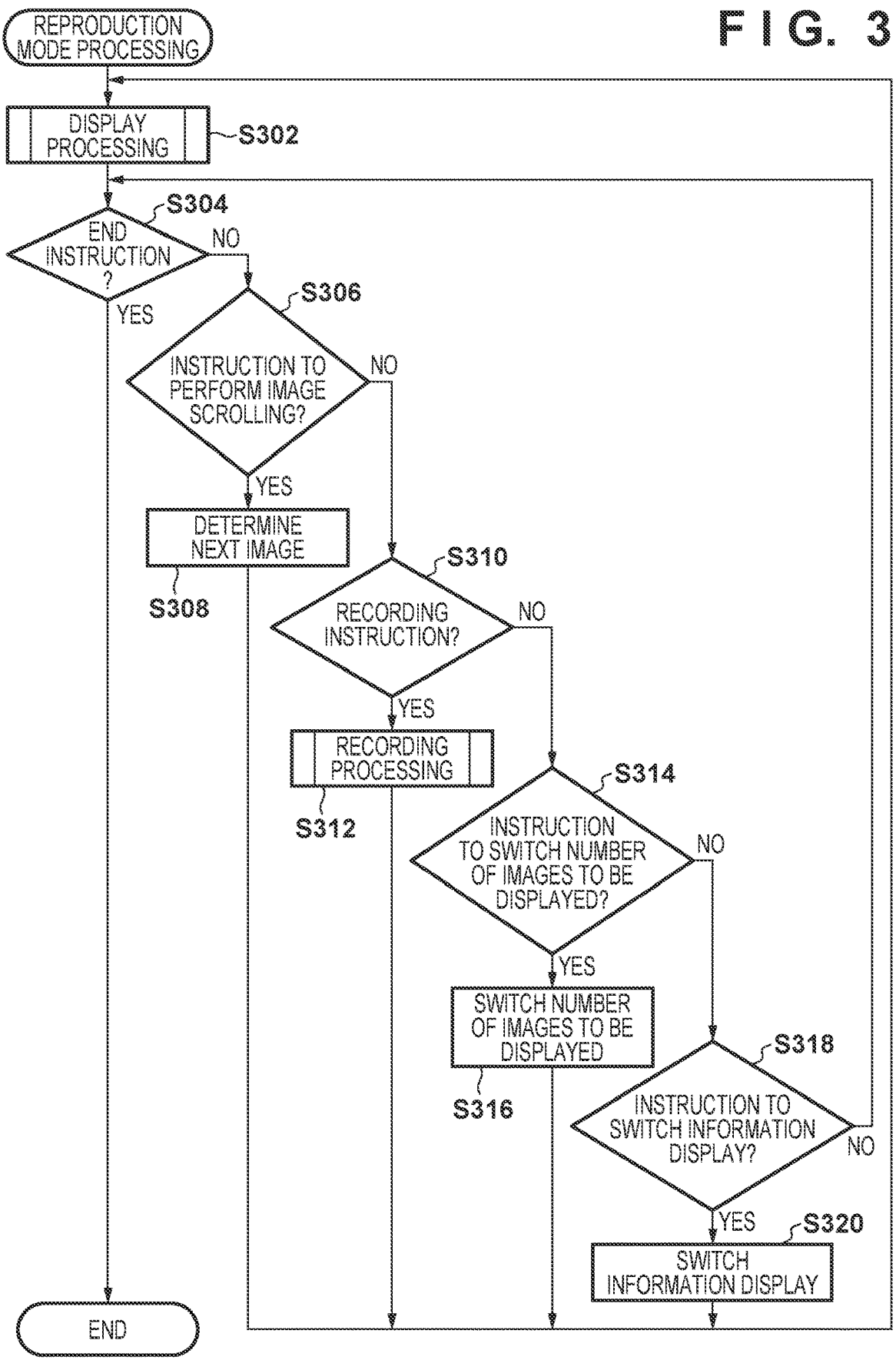
FIG. 3 is a flowchart illustrating reproduction mode processing of the present embodiment.

First, the processing in the reproduction mode when the reproduction button 113 is operated will be described using the flowchart in FIG. 3.

In step S302, the system control unit 201 executes display processing. The display processing will be described later with reference to FIGS. 5A and 5B.

In step S304, the system control unit 201 determines whether or not an end instruction to end the reproduction mode has been made by detecting the operation made on the end button or the like. The system control unit 201, if it is determined that the end instruction has been made, ends the reproduction mode, and if not, advances the processing to step S306.

In step S306, the system control unit 201 determines whether or not an instruction to perform image scrolling has been made by detecting the operation made on the sub electronic dial 107 or the like. The system control unit 201, if it is determined that the instruction to perform image scrolling has been made, advances the processing to step S308, and if not, advances the processing to step S310.

In step S308, the system control unit 201 determines the image to be displayed next by detecting the operation made on the cross key 108 or the like. Thereafter, with the display processing in step S302, which will be described later with reference to FIGS. 5A and 5B, the image determined in step S308 is displayed in the backside display unit 101.

In step S310, the system control unit 201 determines whether or not a recording instruction to record audio data has been made by detecting the operation made on the SET button 109 or the like. The system control unit 201, if it is determined that the recording instruction has been made, advances the processing to step S312, and if not, advances the processing to step S314.

In step S312, the system control unit 201 executes recording processing of audio data. The audio recording processing will be described later with reference to FIG. 7.

In step S314, the system control unit 201 determines whether or not an instruction to switch the number of images to be displayed has been made by detecting the operation made on the enlargement button 111 or the reduction button 112, or the like. The system control unit 201, if it is determined that the instruction to switch the number of images to be displayed has been made, advances the processing to step S316, and if not, advances the processing to step S318.

In step S316, the system control unit 201 switches the number of images to be displayed. For example, it is assumed that there are three patterns, namely one-image display, four-image display, and nine-image display. If one-image display is currently set, and pressing-down of the reduction button 112 is detected, the mode is switched to four-image display to increase the number of images to be displayed. If nine-image display is currently set, and pressing-down of the enlargement button 111 is detected, the mode is switched to four-image display to decrease the number of images to be displayed. After the setting has been made to switch to the next number of images to be displayed, images of the set number are displayed in the next display processing in step S302, which will be described later.

In step S318, the system control unit 201 determines whether or not an instruction to switch the information display has been made by detecting the operation made on the info button 270g or the like. The system control unit 201, if it is determined that the instruction to switch the information display has been made, advances the processing to step S320, and if not, advances the processing to step S304.

In step S320, the system control unit 201 switches the information display. For example, it is assumed that there are two patterns, namely a state in which information is included and a state in which information is not included. In the case of the state in which information is not included, the state is switched to the state in which information is included. In the case of the state in which information is included, the state is switched to the state in which information is not included. After the setting has been made to switch the information display, processing to hide an icon and the like in accordance with the setting of information display is performed in display processing in step S302, which will be described later with reference to FIGS. 5A and 5B.

Figure 4:
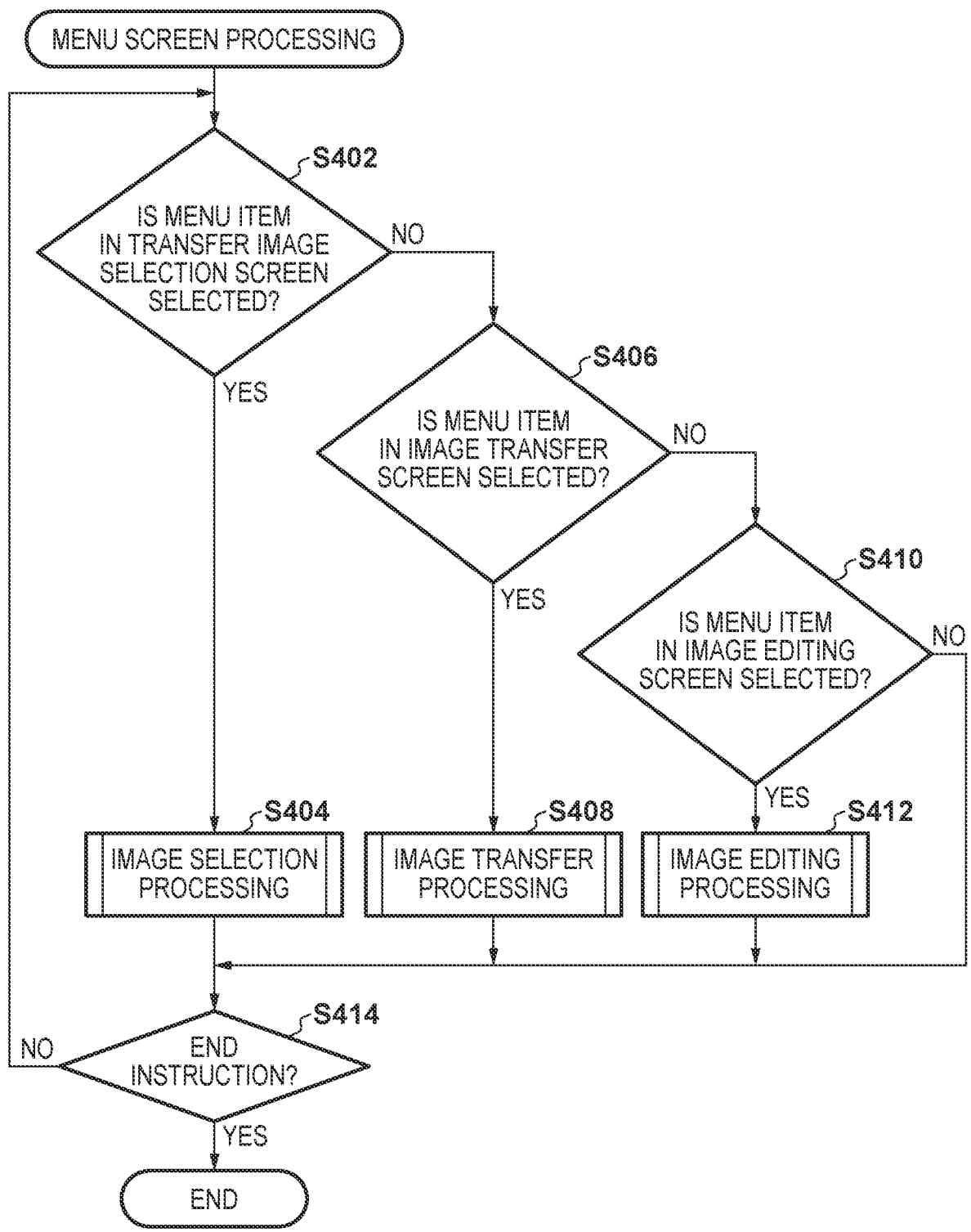
FIG. 4 is a flowchart illustrating menu screen processing of the present embodiment.

Next, the processing regarding the menu screen when the menu button 270e is operated will be described using the flowchart in FIG. 4.

In step S402, the system control unit 201 determines whether or not a menu item in a transfer image selection screen has been selected. The system control unit 201, if it is determined that a menu item has been selected, advances the processing to step S404, and if it is determined that a menu item has not been selected, advances the processing to step S406.

In step S404, the system control unit 201 executes transfer image selection processing. The transfer image selection processing will be described later with reference to FIG. 10.

In step S406, the system control unit 201 determines whether or not a menu item in an image transfer screen has been selected. The system control unit 201, if it is determined that a menu item has been selected, advances the processing to step S408, and if it is determined that a menu item has not been selected, advances the processing to step S410.

In step S408, the system control unit 201 executes image transfer processing. The image transfer processing will be described later with reference to FIGS. 12A and 12B.

In step S410, the system control unit 201 determines whether or not a menu item in an image editing screen has been selected. The system control unit 201, if it is determined that a menu item has been selected, advances the processing to step S412, and if it is determined that a menu item has not been selected, advances the processing to step S414.

In step S412, the system control unit 201 executes image editing processing. The image editing processing will be described later with reference to FIG. 9.

In step S414, the system control unit 201 determines whether or not an end instruction to end the menu screen has been made by detecting the operation made on the end button or the like. The system control unit 201, if it is determined that the end instruction has been made, ends the menu screen, and if not, advances the processing to step S402.

Figure 5B:
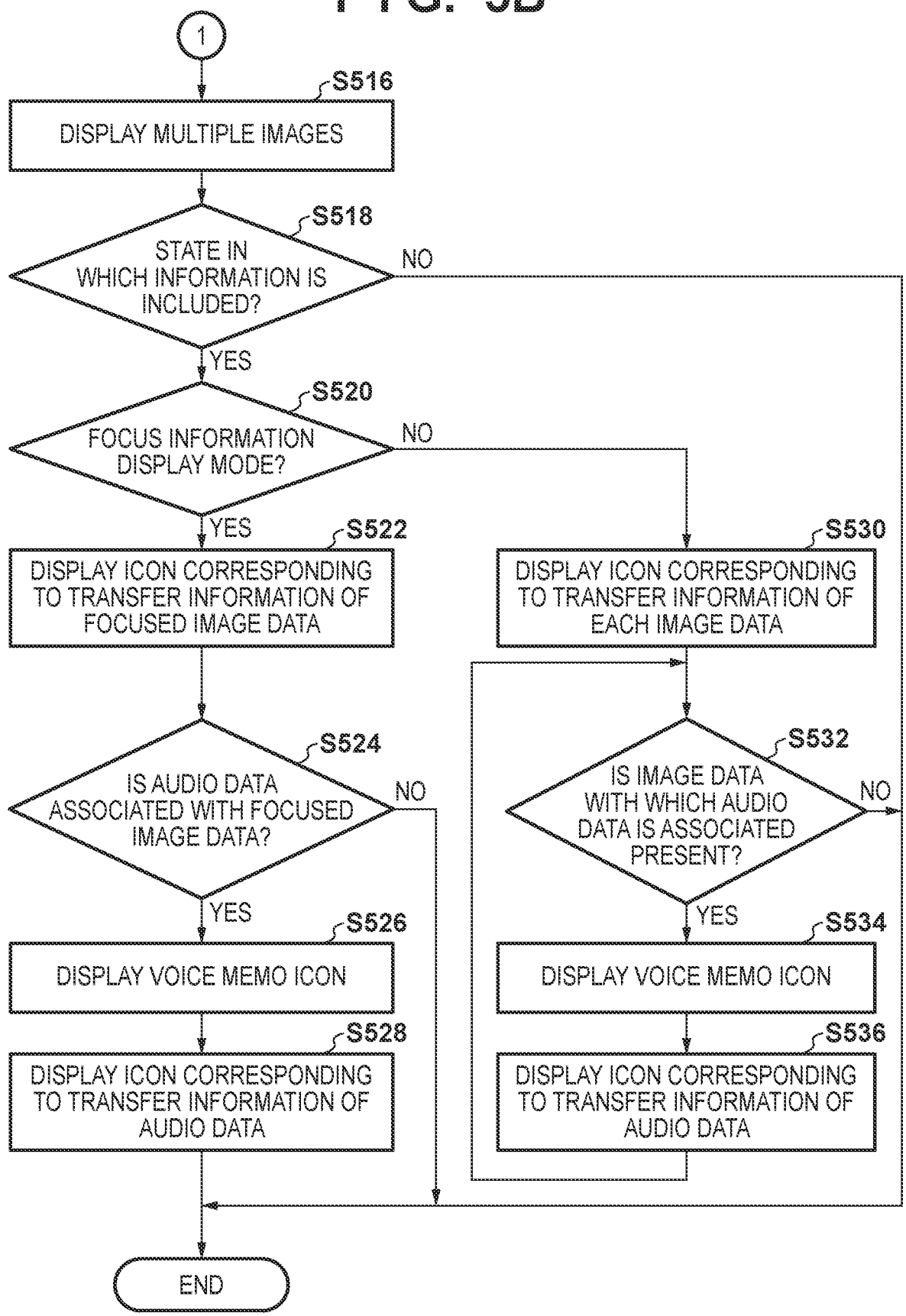

Next, the display processing for displaying an image and an item that is executed during the reproduction mode will be described with reference to the flowchart in FIGS. 5A and 5B and an exemplary UI screens in FIGS. 6A to 6F.

In step S502, the system control unit 201 determines whether the number of images to be displayed that has been set in step S316 is one-image display. The system control unit 201, if it is determined to be one-image display, advances the processing to step S504, and if it is determined to be not one-image display, advances the processing to step S516.

In step S504, the system control unit 201 displays only one image determined in step S308.

In step S506, the system control unit 201 determines whether or not the information display state that has been set in step S320 is the state in which information is included. The system control unit 201, if it is determined to be the state in which information is included, advances the processing to step S508, and if it is determined to be not the state in which information is included, ends the display processing.

In step S508, the system control unit 201 displays an icon corresponding to the transfer information of image data. For example, it is assumed that the transfer information includes four states, namely "not transferred", "transfer target", "already transferred", "transfer failure". When a setting for transfer is configured with respect to image data, the image data enters a state of "transfer target", when transferring image data has been completed, the image data enters a state of "already transferred", when transfer of the image data fails, the image data enters a state of "transfer failure", and if processing regarding transfer has not been performed on the image data, the image data enters a state of "not transferred". In the present embodiment, if the state is the state of "already transferred", an already-transferred-icon is displayed. FIGS. 6A to 6C show exemplary displays in which transfer information is displayed by displaying one image in the entire screen. FIG. 6A shows an exemplary display of transfer information of image data, and an image 602 is displayed in the entire screen, and transfer information 604 of the image 602 is displayed so as to be superimposed on the image 602. The transfer information 604 indicates that the image 602 has already been transferred.

In step S510, the system control unit 201 determines whether or not the image being displayed is associated with audio data. The system control unit 201, if it is determined to be associated with audio data, advances the processing to step S512, and if it is determined to be not associated with audio data, ends the display processing.

In step S512, the system control unit 201 displays an audio data icon in order to indicate that the image being displayed is associated with audio data. FIG. 6B shows an exemplary display when the image 602 is associated with audio data. The audio data icon 606 indicates that the image 602 is associated with audio data.

In step S514, the system control unit 201 displays an icon corresponding to the transfer information of audio data. FIG. 6C shows an exemplary display of the transfer information of audio data that is associated with the image 602. Transfer information 608 of audio data indicates that the audio data that has already been transferred is associated with the image 602. In the present embodiment, the fact that audio data is associated with the image 602 and the transfer information of the audio data are displayed by one icon, but the fact that audio data is associated with image data, and transfer information of the audio data may be indicated by separate icons.

In step S516, the system control unit 201 displays, on the screen, images of the number set in step S316. FIGS. 6D to 6F show examples in which four images and pieces of transfer information are displayed on the screen. FIG. 6D shows an example in which an image 610, an image 612, an image 614, and an image 616 are displayed on the screen, and the image 612 is being focused on.

In step S518, the system control unit 201 determines whether or not the information display state set in S320 is the state in which information is included. The system control unit 201, if it is determined to be the state in which information is included, advances the processing to step S520, and if it is determined to be not the state in which information is included, ends the display processing.

In step S520, the system control unit 201 determines whether or not the mode is set to a mode in which information regarding the focused image is displayed (hereinafter, focus information display mode). The focus information display mode is set on the menu screen. The system control unit 201, if it is determined that the focus information display mode is set, advances the processing to step S522, and if it is determined that the focus information display mode is not set, advances the processing to step S530.

In step S522, the system control unit 201 displays an icon corresponding to the transfer information of the focused image data.

In step S524, the system control unit 201 determines whether or not the focused image data is associated with audio data. The system control unit 201, if it is determined to be associated with audio data, advances the processing to step S526, and if it is determined to be not associated with audio data, ends the display processing.

In step S526, the system control unit 201 displays an audio data icon in order to indicate that audio data is associated with the focused image data.

In step S528, the system control unit 201 displays an icon corresponding to the transfer information of audio data. FIG. 6E shows an exemplary display of transfer information 618 of the image 612 and transfer information 620 of audio data associated with the image 612. The transfer information 618 indicates that the image 612 has already been transferred, and the transfer information 620 of audio data indicates that the audio data that has already been transferred is associated with the image 612.

In step S530, the system control unit 201 displays an icon indicating transfer information of each image data being displayed in accordance with the transfer information of the image data.

In step S532, the system control unit 201 determines whether or not image data, of the pieces of image data being displayed, with which audio data is associated is present. The system control unit 201, if it is determined that image data with which audio data is associated is present, advances the processing to step S534, and if not, ends the display processing.

In step S534, the system control unit 201 displays an audio data icon with respect to image data that is associated with audio data.

In step S536, the system control unit 201 displays, with respect to audio data displayed in step S534, an icon corresponding to the transfer information of the audio data. FIG. 6F shows an exemplary display of the transfer information and the audio data icon or the transfer information of audio data with respect to each image data being displayed. In the image 610, transfer information 622 of the image 610 is displayed in a superimposed manner. In the image 612, transfer information 624 of the image 612 and transfer information 626 of audio data are displayed in a superimposed manner. In the image 614, transfer information 628 of the image 614 and an audio data icon 630 are displayed in a superimposed manner. In the image 616, audio data icon 632 is displayed in a superimposed manner.

Next, the recording processing of audio data will be described with reference to the flowchart in FIG. 7 and the exemplary UI screens in FIGS. 8A to 8C.

Figure 7:
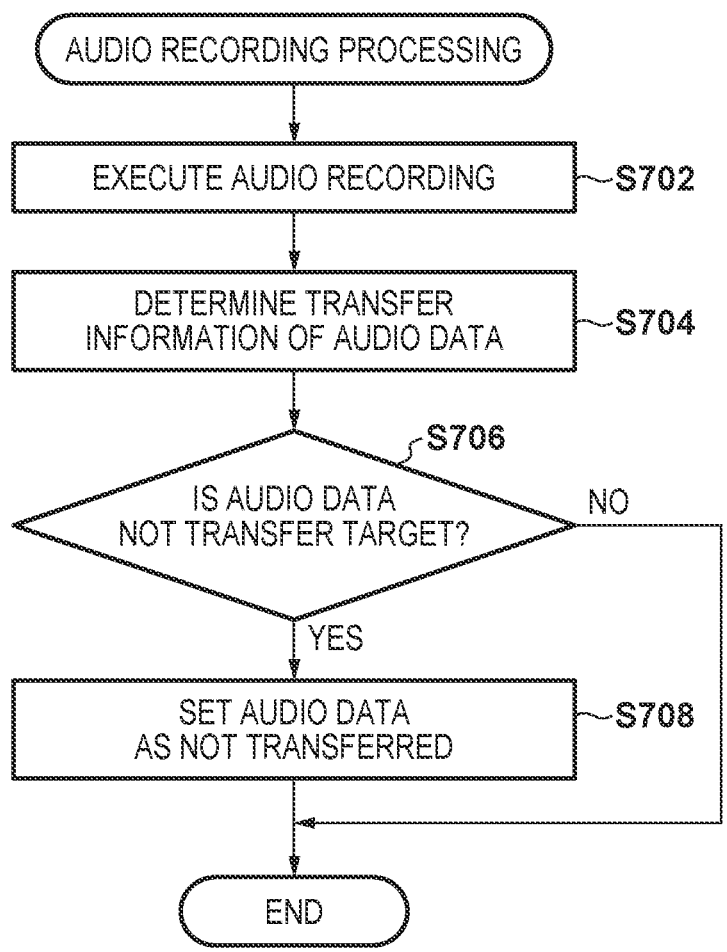
FIG. 7 is a flowchart illustrating audio recording processing of the present embodiment.
Figure 8A:
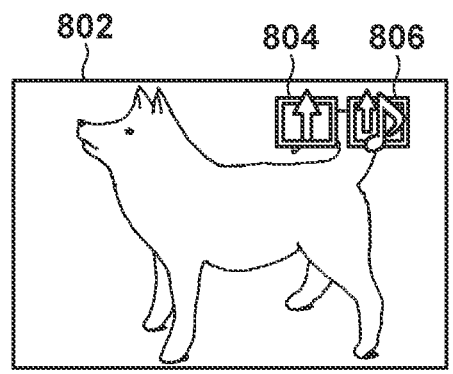
FIGS. 8A to 8C are diagrams illustrating exemplary UI screens of the present embodiment.
Figure 8B:
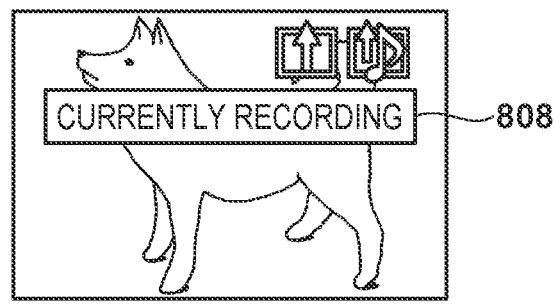
Figure 8C:
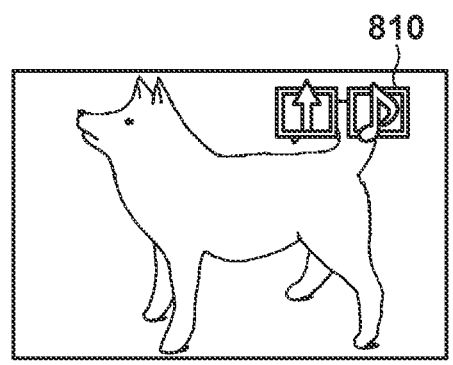

FIG. 7 shows a flowchart of execution of the recording processing of audio data that is initiated when a recording instruction is received during the reproduction mode.

In step S702, the system control unit 201 performs the recording processing of audio data using the audio processing unit 257. If image data being displayed or image data being focused on is not associated with audio data, new audio data is created. The file name of the audio data is the same file name of the image data. As a result of the audio data and the image data having the same file name, it is easily understood that the audio data and the image data are associated. If image data being displayed or image data being focused on is associated with audio data, newly recorded audio data is recorded so as to be added to the associated audio data.

In step S704, the system control unit 201 determines the transfer information of the audio data recorded in step S702.

In step S706, the system control unit 201 determines whether or not the transfer information of the audio data determined in step S704 indicates a transfer target, and if it is determined that the transfer information of the audio data does not indicate a transfer target, advances the processing to step S708, and if it is determined that the transfer information of the audio data indicates a transfer target, ends the audio recording processing.

In step S708, the system control unit 201 re-writes the transfer information of the audio data recorded in step S702 to "not transferred". FIGS. 8A to 8C illustrate exemplary displays while audio data is being recorded. FIG. 8A shows an exemplary display in a state before audio recording is performed so as to be added to the audio data associated with the image 802. Transfer information 804 of the image 802 and transfer information 806 of the audio data associated with the image 802 are displayed. FIG. 8B shows an exemplary display in a state in which audio recording is performed so as to be added to the audio data associated with the image 802. A guidance 808 that indicates that audio recording is undergoing is displayed. FIG. 8C shows an exemplary display in a state after completing audio recording that has been performed so as to be added to the audio data associated with the image 802. Since the recording has been performed so as to be added to the audio data associated with the image 802, the displayed information is switched from the transfer information 806 of the audio data associated with the image 802 to an audio data icon 810 associated with the image 802.

In this way, if audio recording is performed so as to be added to audio data that has already been transferred, the transfer information of the audio data is re-written to "not transferred", and as a result, the transfer information of audio data can be accurately confirmed. Also, when recording has been performed so as to be added to audio data, if the audio data was a transfer target, as a result of not re-writing the transfer information of audio data, the audio data is intentionally set as a transfer target, and the transfer operation that is intended to be performed upon receiving the next operation is not hindered.

Next, the editing processing of image data when an image editing item is selected in the menu screen will be described with reference to the flowchart in FIG. 9.

In step S902, the system control unit 201 selects an image on which editing processing is to be performed.

In step S904, the system control unit 201 performs image editing processing. The image editing processing includes resizing processing, processing for applying a filter effect on an image, and trimming processing, for example. One of the types of processing is executed on an image, and the image is saved. The method of saving the processed image may include overwriting saving and saving as a new separate image.

In step S906, the system control unit 201 confirms the transfer information of an image on which processing has been executed in step S904.

In step S908, the system control unit 201 determines whether or not the transfer information of the image on which processing has been executed in step S904 indicates a transfer target, and if it is determined to not be a transfer target, advances the processing to step S910, and if it is determined to be a transfer target, ends the editing processing.

In step S910, the system control unit 201 re-writes the transfer information of the image on which processing is executed in step S904 to "not transferred". Also, if the image on which processing is executed in step S904 is associated with audio data, the transfer information of the audio data is also re-written to "not transferred".

In this way, if image data is edited, the both pieces of transfer information of the image data and audio data associated therewith are re-written to "not transferred", and therefore the transfer information of the audio data that is associated can also be referenced to when determining whether or not the image data and the audio data need to be transferred.

Figure 10:
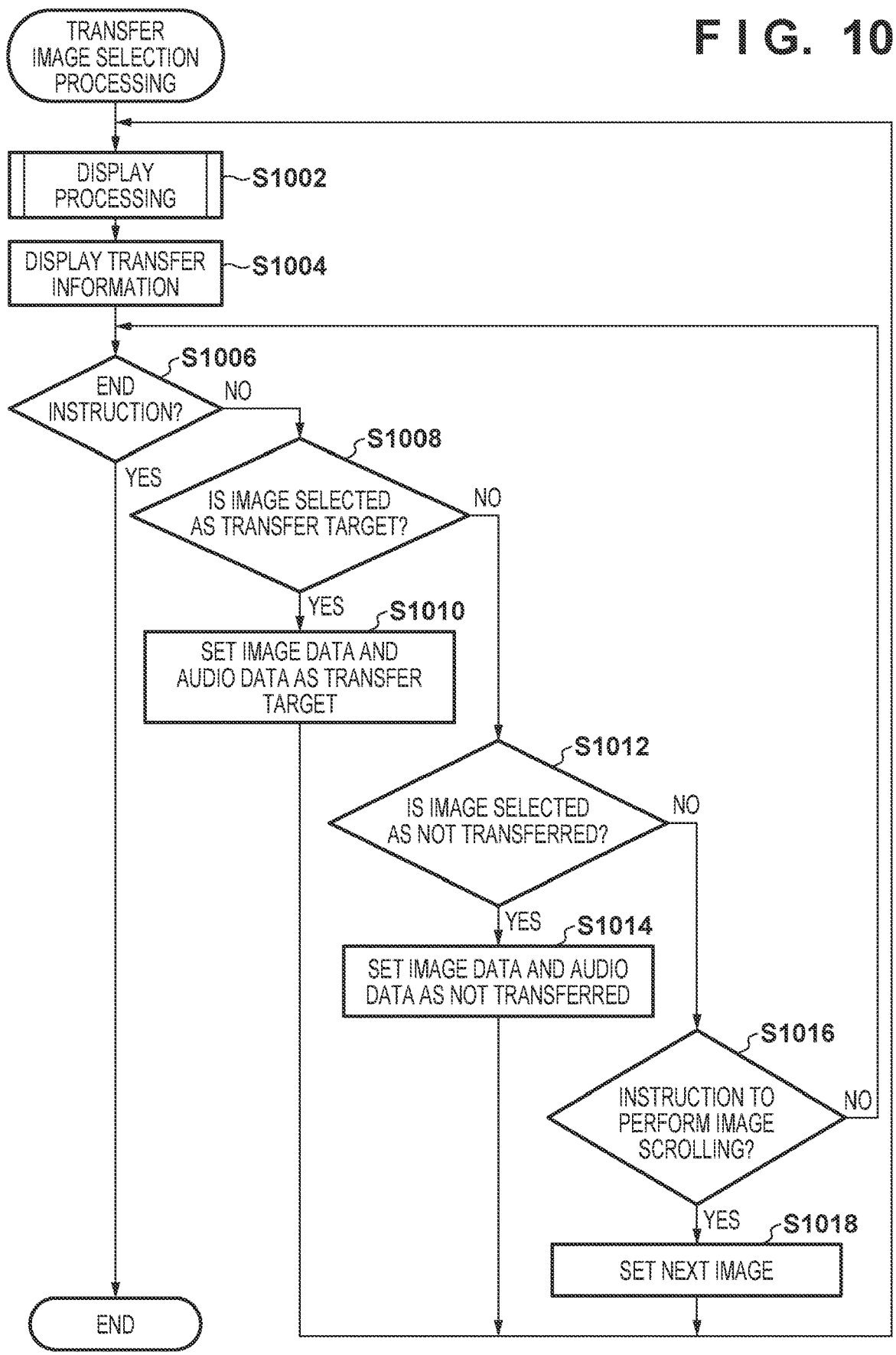
FIG. 10 is a flowchart illustrating transfer image selection processing of the present embodiment.
Figure 11A:
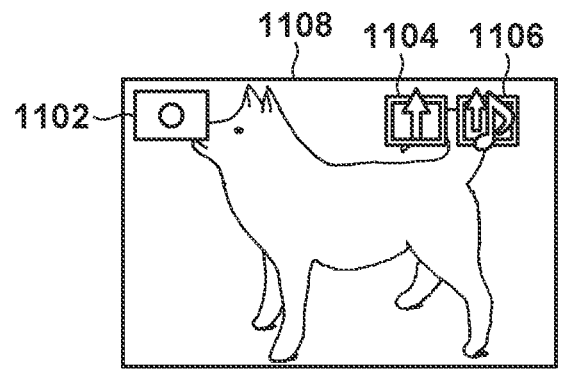
FIGS. 11A to 11C are diagrams illustrating exemplary UI screens of the present embodiment.
Figure 11B:
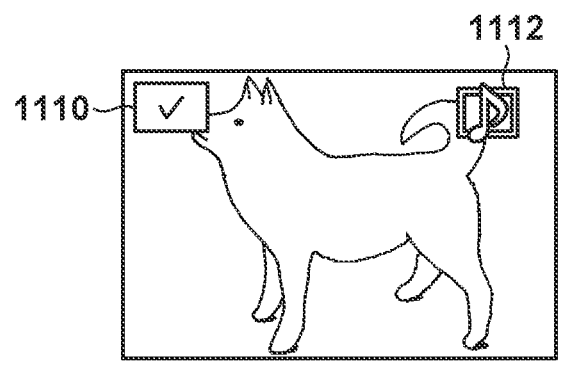
Figure 11C:
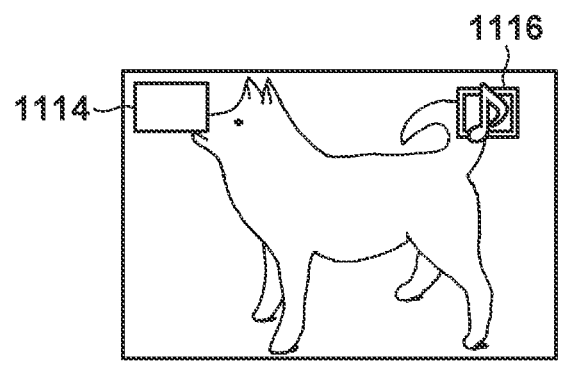

Next, the processing for selecting an image to be transferred when a transfer image selection item is selected in the menu screen will be described with reference to the flowchart in FIG. 10 and the exemplary UI screens in FIGS. 11A to 11C.

In step S1002, the system control unit 201 executes the display processing described with reference to FIGS. 5 and 6.

In step S1004, the system control unit 201 displays the transfer information of image data being displayed or image data being focused on. FIGS. 11A to 11C show exemplary displays when the transfer information is changed in the transfer image selection processing. In FIG. 11A, a transfer information change guide 1102 is displayed, and the content of transfer information 1104 of an image 1108 is displayed in the transfer information change guide 1102. In the transfer information change guide 1102, because the transfer information of the image 1108 indicates "already transferred", a circle icon is displayed. The image 1108 is associated with audio data, and a transfer information 1106 of the audio data is displayed.

In step S1006, the system control unit 201 determines whether or not an end instruction to end the transfer image selection processing has been made by detecting an operation made on the end button or the like, and if it is determined that the end instruction has been made, ends the transfer image selection processing, and if it is determined that the end instruction has not been made, advances the processing to step S1008.

In step S1008, the system control unit 201 determines whether or not image data being displayed or image data being focused on has been selected as a transfer target by detecting an operation made on the SET button 109 or the like. The system control unit 201, if it is determined that the image data has been selected as a transfer target, advances the processing to step S1010, and if it is determined that the image data has not been selected as a transfer target, advances the processing to step S1012.

In step S1010, the system control unit 201 re-writes the transfer information of the image data being displayed or the image data being focused on, and the transfer information of the audio data that is associated with the image data being displayed or the image data being focused on to "transfer target". In the processing in step S1010, even if the transfer information of the image data is "already transferred", the transfer information of the audio data associated with the image data is re-written to "transfer target". Note that, with respect to the transfer information, both of "already transferred" and "transfer target" may be recorded in the transfer information. In this case, in the processing in step S1010, "transfer target" may be recorded so as to be added in the transfer information of the audio data associated with the image data.

In step S1012, the system control unit 201 determines whether or not image data being displayed or image data being focused on has been selected as "not transferred" by detecting an operation made on the info button 270g. The system control unit 201, if it is determined that the image data has been selected as "not transferred", advances the processing to step S1014, and if it is determined that the image data has not been selected as "not transferred", advances the processing to step S1016.

In step S1014, the system control unit 201 re-writes the transfer information of the image data being displayed or the image data being focused on, and the transfer information of the audio data that is associated with the image data being displayed or the image data being focused on to "not transferred".

In step S1016, the system control unit 201 determines whether or not an image scrolling instruction has been made by detecting an operation made on the sub electronic dial 107 or the like, and if it is determined that the image scrolling instruction has been made, advances the processing to step S1018, and if not, advances the processing to S1006.

In step S1018, the system control unit 201 determines the image to be displayed next by detecting an operation made on the cross key 108 or the like. Thereafter, the image determined in step S1018 is displayed in the backside display unit 101 by performing the display processing in step S1002. FIG. 11B shows an exemplary display when, with respect to the image 1108 displayed in FIG. 11A, the transfer information of the image data is re-written to "transfer target". Because the transfer information of the image 1108 is re-written to "transfer target", a check icon indicating to be "transfer target" is displayed in a transfer information change guide 1110. An audio data icon 1112 indicates that, because the transfer information of the image 1108 is re-written to "transfer target", the transfer information of the audio data associated with the image 1108 is re-written to "transfer target". FIG. 11C shows an exemplary display when, with respect to the image 1108 displayed in FIG. 11A, the transfer information of the image data is re-written to "not transferred". Since the transfer information of the image 1108 has been re-written to "not transferred", an icon is not displayed in a transfer information change guide 1114 so as to indicate to be "not transferred". An audio data icon 1116 indicates that, since the transfer information of the image 1108 has been re-written to "not transferred", the transfer information of the audio data associated with the image 1108 is re-written to "not transferred".

Figures 1, 12A:
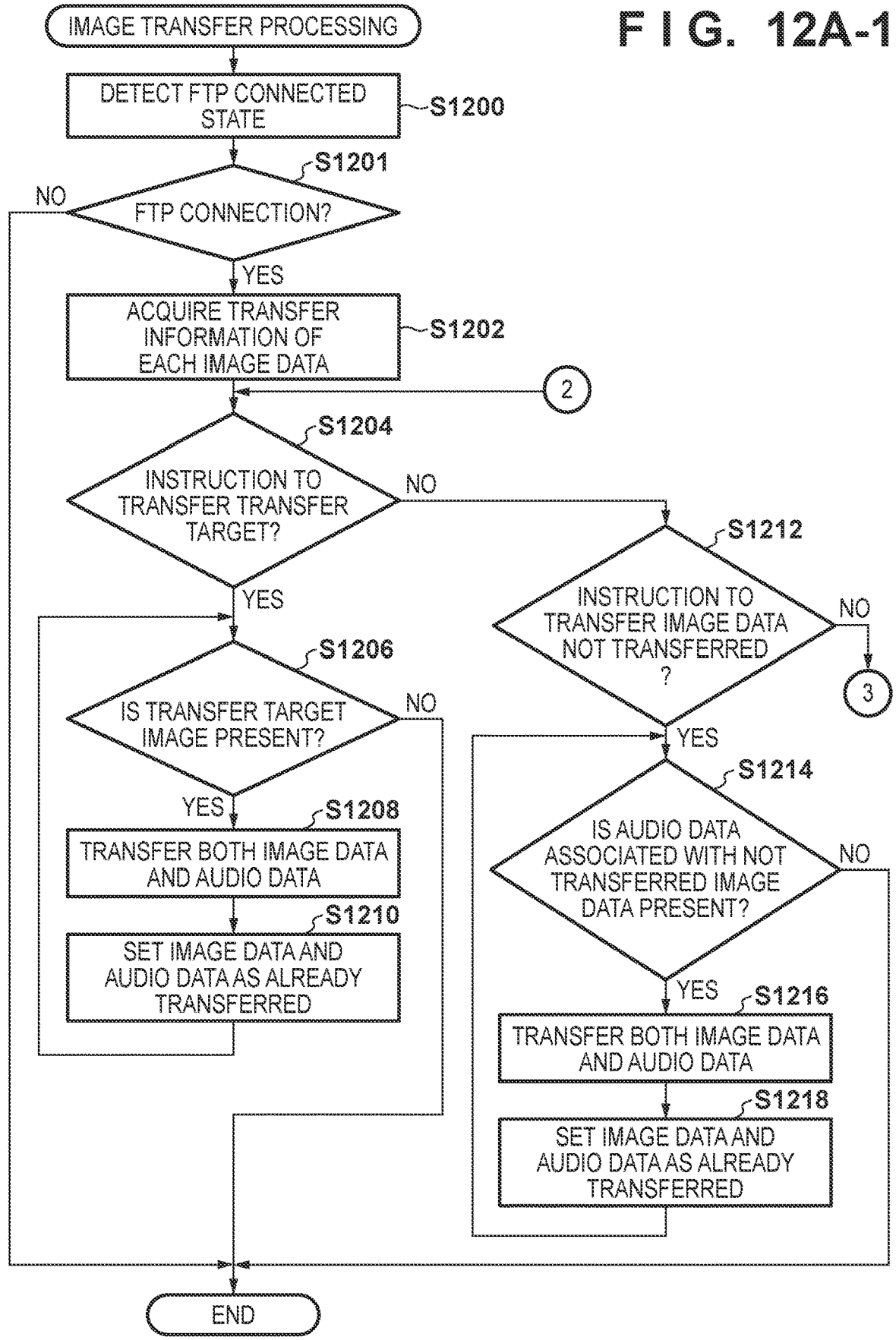
Figures 2, 12A:
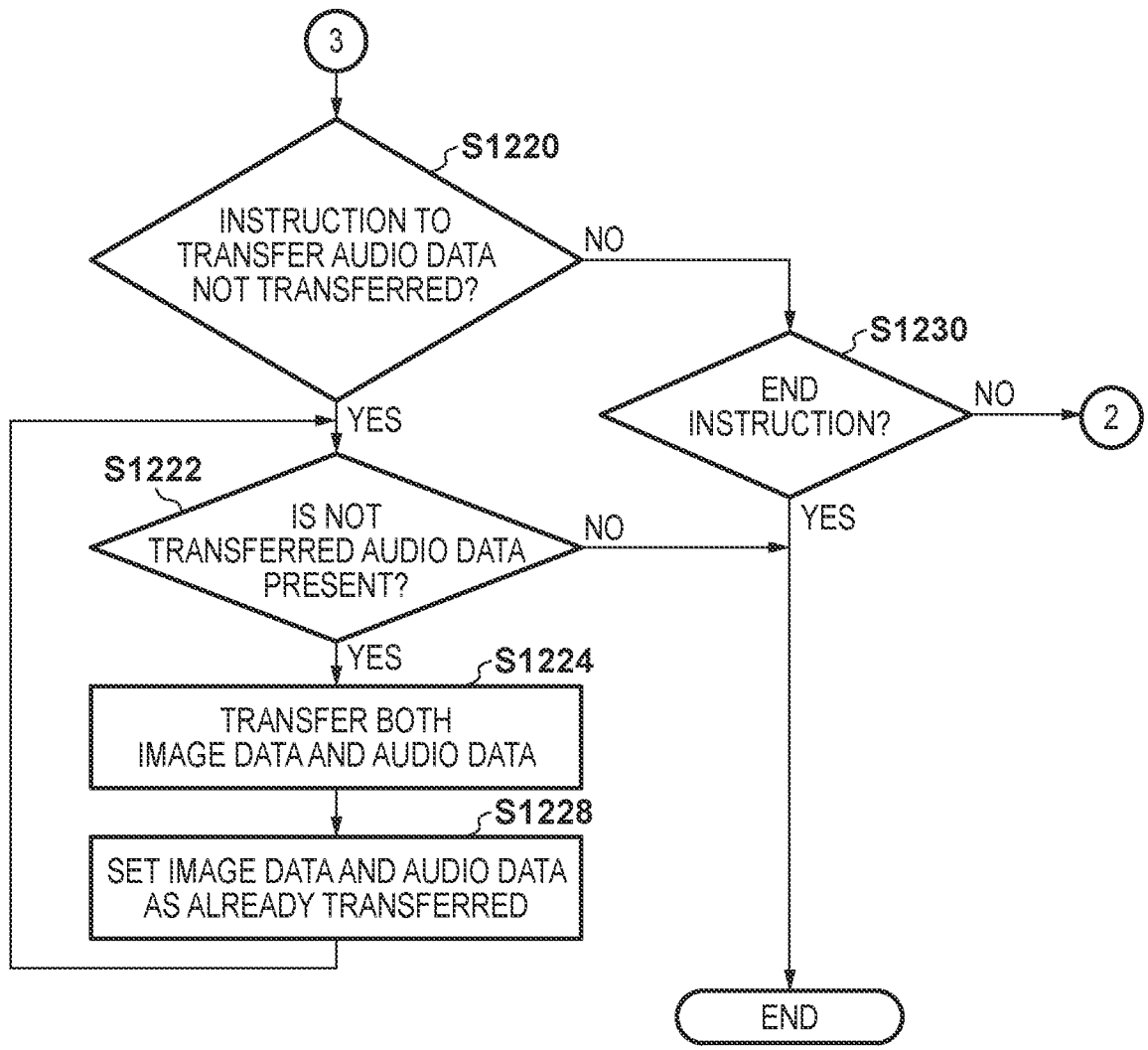

Next, the image transfer processing when an image transfer processing item has been selected in the menu screen will be described with reference to the flowchart in FIGS. 12A-1 and 12A-2 and the exemplary UI screen in FIG. 12B.

Figure 12B:
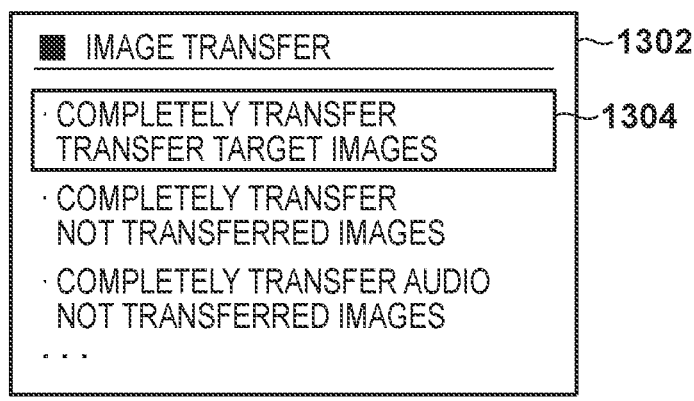
FIG. 12B is a diagram illustrating an exemplary UI screen of the present embodiment.

FIG. 12B illustrates an exemplary display of selectable items in the image transfer processing. The transfer processing is executed after determining a desired transfer method by operating a focus 1304 using the cross key 108 and operating the SET button 109.

In step S1200, the system control unit 201 detects an FTP connected state.

In step S1201, the system control unit 201 determines whether or not an FTP connected state has been detected, and if it is determined that an FTP connected state has been detected, advances the processing to step S1202, and if it is determined that an FTP connected state has not been detected, ends the image transfer processing.

In step S1202, the system control unit 201 acquires the transfer information of each image data.

In step S1204, the system control unit 201 determines whether or not an instruction to transfer the transfer target image data has been made, and if it is determined that the instruction to transfer the image data has been made, advances the processing to step S1206, and if not, advances the processing to step S1212.

In step S1206, the system control unit 201 determines whether or not transfer target image data is present, and if it is determined that transfer target image data is present, advances the processing to step S1208, and if not, ends the image transfer processing.

In step S1208, the system control unit 201 transfers the transfer target image data and the audio data associated with the image data to the external apparatus 300.

In step S1210, the system control unit 201 re-writes the transfer information of each of the image data and the audio data that have been transferred to the external apparatus 300 in step S1208 to "already transferred".

In step S1212, the system control unit 201 determines whether or not an instruction to transfer image data with respect to which the transfer information of the image data or the audio data associated with the image data is "not transferred" has been made. The system control unit 201, if it is determined that the instruction to transfer image data whose transfer information is "not transferred" has been made, advances the processing to step S1214, and if not, advances the processing to step S1220.

In step S1214, the system control unit 201 determines whether or not image data with respect to which the transfer information of the image data or the audio data associated with the image data is "not transferred" is present. The system control unit 201, if it is determined that image data whose transfer information is "not transferred" is present, advances the processing to step S1216, and if not, ends the image transfer processing.

In step S1216, the system control unit 201 transfers the image data with respect to which the transfer information of the image data or the audio data associated with the image data is "not transferred" and the audio data associated with the image data to the external apparatus 300.

In step S1218, the system control unit 201 re-writes the transfer information of the image data and the audio data that have been transferred to the external apparatus 300 in step S1216 to "already transferred".

In step S1220, the system control unit 201 determines whether or not an instruction to transfer image data with respect to which the transfer information of audio data associated with the image data is "not transferred" has been made. The system control unit 201, if it is determined that the instruction to transfer image data with respect to which the transfer information of the audio data is "not transferred" has been made, advances the processing to step S1222, and if not, advances the processing to step S1230.

In step S1222, the system control unit 201 determines whether or not image data with respect to which the transfer information of audio data associated with the image data is "not transferred" is present. The system control unit 201, if it is determined that image data with respect to which the transfer information of the audio data is "not transferred" is present, advances the processing to step S1224, and if not, ends the image transfer processing.

In step S1224, the system control unit 201 transfers the image data with respect to which the transfer information of audio data associated with the image data is "not transferred" and the audio data associated with the image data to the external apparatus 300.

In step S1226, the system control unit 201 re-writes the transfer information of each of the image data and the audio data that have been transferred to the external apparatus 300 in step S1224 to "already transferred".

In step S1230, the system control unit 201 determines whether or not an end instruction to end the image transfer processing has been made by detecting the operation made on the end button or the like, and if it is determined that the end instruction has been made, ends the image transfer processing, and if not, returns the processing to step S1204.

As described above, according to the present embodiment, a user can easily confirm the transfer state of audio data that is recorded so as to be added to image data that has already been transferred.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-079567, filed Apr. 18, 2019 which is hereby incorporated by reference herein in its entirety.

What is claimed is:

1. A data transfer apparatus comprising:
an interface configured to connect to an external apparatus; and
a memory and at least one processor and/or at least one circuit to perform operations of the following units:
a transfer unit configured to transfer image data to the external apparatus connected by the interface;
a recording unit configured to generate and record the image data and information indicating a transfer state of the image data; and
a control unit configured to control so as to transfer the image data and related data associated with the image data,
wherein the recording unit is configured to, with respect to image data that has already been transferred, if related data associated with the image data has been edited, generate information indicating a transfer state of the edited related data and record the information indicating the transfer state of the edited related data so as to be associated with the related data and to be distinguishable from the information indicating the transfer state of the image data.

2. The apparatus according to claim 1, wherein
the related data is audio data or text data, and
the information indicating the transfer state is information including a state of one of "transfer target", "already transferred", "not transferred", and "transfer failure".

3. The apparatus according to claim 1, wherein
the recording unit is configured to, with respect to the image data that has already been transferred, if related data associated with the image data has been edited, generate and record information indicating that the edited related data has not been transferred.

4. The apparatus according to claim 1, wherein the at least one processor further functions as:
a selecting unit configured to select image data, from image data recorded by the recording unit, that is to be transferred to the external apparatus; and
a display unit configured to display image data recorded in the recording unit, and information regarding the image data that is recorded in the recording unit.

5. The apparatus according to claim 4, wherein
the control unit is configured to, if related data associated with image data being displayed in the display unit is present, control so as to display information indicating that the related data is associated with the image data being displayed.

6. The apparatus according to claim 4, wherein
the control unit is configured to, if a plurality of pieces of image data are displayed in the display unit, control so as to display information indicating a transfer state of selected image data and information indicating a transfer state of related data associated with the image data.

7. The apparatus according to claim 4, wherein
the control unit is configured to, if a plurality of pieces of image data are displayed in the display unit, control so as to display information indicating a transfer state of each image data, and information indicating a transfer state of related data associated with each image data.

8. The apparatus according to claim 4, wherein
if a setting is configured to not display information indicating the transfer state in the display unit, the control unit displays only image data.

9. The apparatus according to claim 4, wherein
the recording unit is configured to, if image data that has already been transferred is selected as "transfer target" by the selecting unit, re-write and record information indicating the transfer state to "transfer target", with respect to the selected image data and related data associated with the image data.

10. The apparatus according to claim 4, wherein
the recording unit is configured to, if image data that has already been transferred is selected as a transfer target by the selecting unit, add "transfer target" to information indicating the transfer state and record the information, with respect to the selected image data and related data associated with the image data.

11. The apparatus according to claim 4, wherein
the recording unit is configured to, if image data that has already been transferred is selected as "not transferred" by the selecting unit, re-write and record information indicating the transfer state to "not transferred", with respect to the selected image data and related data associated with the image data.

12. The apparatus according to claim 1, wherein
the recording unit is configured to, if the image data has been edited, record "not transferred" to information indicating a transfer state, with respect to the edited image data and related data associated with the image data.

13. The apparatus according to claim 12, wherein
the editing of image data is processing for applying a filter effect on the image data, resizing processing, or trimming processing.

14. The apparatus according to claim 1, wherein
the recording unit is configured to, if the related data has been edited, and the related data is not a transfer target, record "not transferred" to information indicating a transfer state of the related data.

15. The apparatus according to claim 14, wherein
the editing of related data is processing for, if the related data is audio data, recording the related data so as to be added to the audio data.

16. The apparatus according to claim 1, wherein
the control unit is configured to, when pieces of image data that have not been transferred are collectively transferred, if one of the image data and related data associated with the image data has not been transferred, control so as to transfer both of the image data and the related data.

17. The apparatus according to claim 1, wherein
the control unit is configured to, if the related data has not been transferred, control so as to transfer both of the image data and related data associated with the image data.

18. The apparatus according to claim 1, wherein
the data transfer apparatus is an image capturing apparatus that captures an image and generates image data.

19. A method of controlling a data transfer apparatus that can transfer image data to an external apparatus connected by an interface, the method comprising:
generating and recording information indicating a transfer state of the image data; and
controlling so as to transfer the image data and related data associated with the image data,
wherein, in the recording, with respect to image data that has already been transferred, when related data associated with the image data has been edited, information indicating a transfer state of the edited related data is generated and recorded so as to be associated with the related data and to be distinguishable from the information indicating the transfer state of the image data.

20. A non-transitory computer-readable storage medium storing a program for causing a computer to function as a data transfer apparatus comprising:
an interface configured to connect to an external apparatus;
a transfer unit configured to transfer image data to the external apparatus connected by the interface;
a recording unit configured to generate and record the image data and information indicating a transfer state of the image data; and
a control unit configured to control so as to transfer the image data and related data associated with the image data,
wherein the recording unit is configured to, with respect to image data that has already been transferred, if related data associated with the image data has been edited, generate information indicating a transfer state of the edited related data and record the information indicating the transfer state of the edited related data so as to be associated with the related data and to be distinguishable from the information indicating the transfer state of the image data.

* * * * *